US007493515B2

(12) United States Patent
Armstrong et al.

(10) Patent No.: US 7,493,515 B2
(45) Date of Patent: *Feb. 17, 2009

(54) ASSIGNING A PROCESSOR TO A LOGICAL PARTITION

(75) Inventors: William J. Armstrong, Rochester, MN (US); Naresh Nayar, Rochester, MN (US); Gary R. Ricard, Chatfield, MN (US)

(73) Assignee: International Business Machines Corporation, Armonk, NY (US)

( * ) Notice: Subject to any disclaimer, the term of this patent is extended or adjusted under 35 U.S.C. 154(b) by 531 days.

This patent is subject to a terminal disclaimer.

(21) Appl. No.: 11/241,695

(22) Filed: Sep. 30, 2005

(65) Prior Publication Data

US 2007/0079102 A1  Apr. 5, 2007

(51) Int. Cl.
*G06F 11/00* (2006.01)
(52) U.S. Cl. ............................ 714/10; 714/11; 714/12; 714/13; 718/1
(58) Field of Classification Search ............ 714/10–13; 718/1
See application file for complete search history.

(56) References Cited

U.S. PATENT DOCUMENTS

| 6,502,206 B1* | 12/2002 | Kosuge et al. ............... 714/13 |
| 7,065,641 B2* | 6/2006 | Schelling ...................... 713/2 |
| 2003/0037092 A1* | 2/2003 | McCarthy et al. ........... 709/104 |
| 2004/0199632 A1* | 10/2004 | Romero et al. ............. 709/226 |
| 2004/0221193 A1* | 11/2004 | Armstrong et al. ........... 714/10 |

OTHER PUBLICATIONS

U.S. Appl. No. 10/888,391, entitled "System and Method for Predictive Processor Failure Recovery" filed Jul. 18, 2004 by Thomas J. Fox et al.

* cited by examiner

Primary Examiner—Yolanda L Wilson
(74) Attorney, Agent, or Firm—Biggers & Ohanian, LLP

(57) ABSTRACT

Assigning a processor to a logical partition in a computer supporting multiple logical partitions that include assigning priorities to partitions, detecting a checkstop of a failing processor of a partition, retrieving the failing processor's state, replacing by a hypervisor the failing processor with a replacement processor from a partition having a priority lower than the priority of the partition of the failing processor, and assigning the retrieved state of the failing processor as the state of the replacement processor.

6 Claims, 9 Drawing Sheets

ASSIGNING A PROCESSOR TO A LOGICAL PARTITION

CROSS-REFERENCE TO RELATED APPLICATION

This application is related to commonly-assigned application Ser. No. 11/241,709, filed on even date herewith, entitled "REPLACING A FAILING PHYSICAL PROCESSOR", which is hereby incorporated by reference herein in its entirety.

BACKGROUND OF THE INVENTION

1. Field of the Invention

The field of the invention is data processing, or, more specifically, methods, apparatus, and products for assigning a processor to a logical partition in a computer supporting multiple logical partitions.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area in which advances have been made is in parallel processing of many threads of execution in partitions assigned their own resources and running separate operating systems. The shift in computer hardware and software to a highly parallel, logically partitioned model has provided opportunities for high system availability that were practically nonexistent just a few years ago. One mechanism for maintaining high availability permits dynamic runtime replacement of a processor predicted to fail with an unused processor provided the failing processor can continue to function long enough to complete the replacement process. Another mechanism for high availability maintains complete processor state information such that, even in the event of a catastrophic processor failure (e.g., a checkstop), the work a processor is performing can continue on a replacement processor. The importance of a replacement processor in these recovery mechanisms is readily apparent. It is clear where to acquire these replacements if unused processors are available. Unused processors, however, are generally wasteful and expensive and, as a consequence, are rare on most systems. When a processor checkstops and no unused processors are available a system has two choices: it can terminate or the underlying hypervisor can run the partition as though it has more processors than are physically available. Both these cases are undesirable; in the former the partition is dead, and in the latter, the partition is not running at desired performance levels. Certainly, some partition on the system must suffer if a utilized processor checkstops, but letting chance select the partition to suffer based on a random failing processor is not an optimal procedure.

SUMMARY OF THE INVENTION

Methods, apparatus, and computer program products are disclosed that operate generally to assign a replacement processor to a logical partition in a computer supporting multiple logical partitions by using assigned partition priorities to allow all processors on a system to perform useful work until a processor is needed as a replacement processor and, once needed, deallocating processing resources in a predictable manner that reduces impact on end-user operations. More particularly, methods, apparatus, and computer program products are disclosed for assigning a processor to a logical partition in a computer supporting multiple logical partitions that include assigning priorities to partitions, detecting a checkstop of a failing processor of a partition, retrieving the failing processor's state, replacing by a hypervisor the failing processor with a replacement processor from a partition having a priority lower than the priority of the partition of the failing processor, and assigning the retrieved state of the failing processor as the state of the replacement processor.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
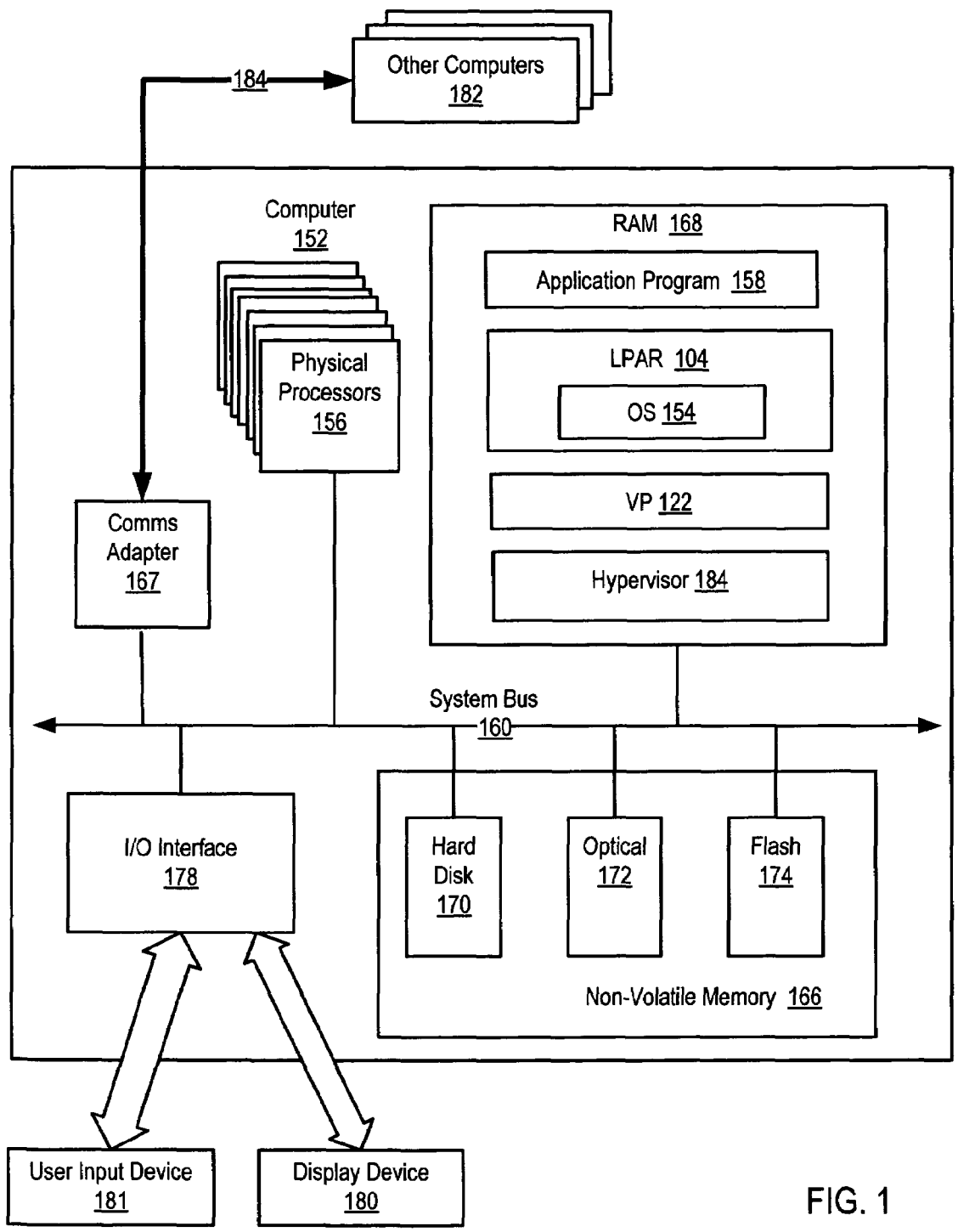
FIG. 1 sets forth a block diagram of automated computing machinery comprising an exemplary computer useful in assigning a processor to a logical partition according to embodiments of the present invention.

Exemplary methods, apparatus, and products for assigning a processor to a logical partition according to embodiments of the present invention are described with reference to the accompanying drawings, beginning with FIG. 1. Assigning a processor to a logical partition according to embodiments of the present invention is generally implemented with computers, that is, with automated computing machinery. For further explanation, therefore, FIG. 1 sets forth a block diagram of automated computing machinery comprising an exemplary computer (152) useful in assigning a processor to a logical partition according to embodiments of the present invention. The computer (152) of FIG. 1 includes a number of physical processors (156) as well as random access memory (168) ('RAM') which is connected through a system bus (160) to the processors (156) and to other components of the computer. Stored in RAM (168) is a hypervisor (184), computer program instructions for managing logical partitions ('LPARs'). The hypervisor (184) administers the assignment of physical resources such as memory and processing resources to LPARs, controls the physical memory locations that can be accessed from within an LPAR, and controls access to I/O memory space. In addition, the hypervisor (184) schedules virtual processors on physical processors and administers the assignment of virtual processors to LPARs.

The hypervisor (184) in this example is improved for assigning a processor to a logical partition in a computer supporting multiple logical partitions according to embodiments of the present invention by assigning priorities to partitions, detecting a checkstop of a failing processor of a partition, retrieving the failing processor's state, replacing by a hypervisor the failing processor with a replacement processor from a partition having a priority lower than the priority of the partition of the failing processor, and assigning the retrieved state of the failing processor as the state of the replacement processor.

Also stored RAM (168) is a virtual processor (122), computer program instructions representing assignments of physical processor resources to LPARs. Also stored in RAM (168) is an LPAR (104), a set of data structures and services that support distribution of computer resources by a hypervisor within a single computer to make the computer function as if it were two or more independent computers. An LPAR is assigned all the resources it needs to operate as though it were an independent computer, including processor time, memory, an operating system, and so on. Also stored in RAM is an application program (158), computer program instructions for user-level data processing.

Also stored in RAM (168) is an operating system (154). Operating systems useful in computers according to embodiments of the present invention include UNIX™, Linux™, Microsoft NT™, AIX™, IBM's i5/OS™, and others as will occur to those of skill in the art. Hypervisor (184), virtual processor (122), operating system (154), LPAR (104) and application program (158) in the example of FIG. 1 are shown in RAM (168), but many components of such software typically are stored in non-volatile memory (166) also.

Computer (152) of FIG. 1 includes non-volatile computer memory (166) coupled through a system bus (160) to the physical processors (156) and to other components of the computer (152). Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The example computer of FIG. 1 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

The exemplary computer (152) of FIG. 1 includes a communications adapter (167) for implementing data communications (184) with other computers (182). Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful for determining availability of a destination according to embodiments of the present invention include modems for wired dial-up communications, Ethernet (IEEE 802.3) adapters for wired network communications, and 802.11b adapters for wireless network communications.

Figure 2:
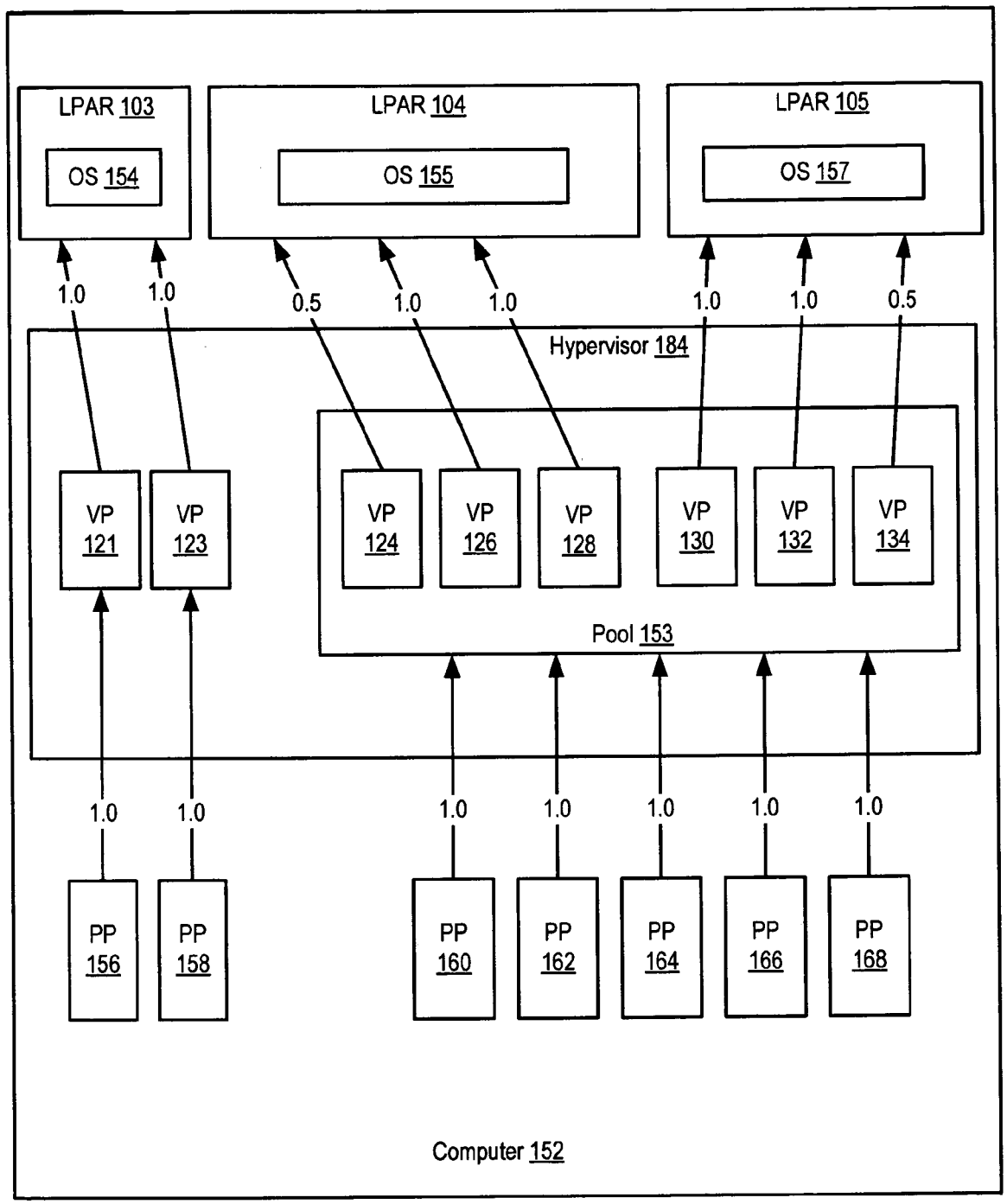
FIG. 2 sets forth a function block diagram of an exemplary system for assigning a processor to a logical partition according to embodiments of the present invention.

FIG. 2 sets forth a function block diagram of an exemplary system for assigning a processor to a logical partition according to embodiments of the present invention. The system of FIG. 2 includes a hypervisor (184), a layer of system software that manages LPARs. The hypervisor (184) in this example is improved for assigning a processor to a logical partition in a computer supporting multiple logical partitions according to embodiments of the present invention by assigning priorities to partitions, detecting a checkstop of a failing processor of a partition, retrieving the failing processor's state, replacing by a hypervisor the failing processor with a replacement processor from a partition having a priority lower than the priority of the partition of the failing processor, and assigning the retrieved state of the failing processor as the state of the replacement processor.

FIG. 2 also includes LPARs (103, 104, 105). Each LPAR (103, 104, 105) has an operating system (154, 155, 157) running in it, and each operating system may be different. A system with three LPARs, for example, may simultaneously run Linux™ in one LPAR, IBM's AIX™ in another LPAR, and IBM's i5/OS in another LPAR.

FIG. 2 also includes multiple physical processors (156, 158, 160, 162, 164, 166, 168). Physical processors (156, 158) are dedicated exclusively to LPAR (103) through virtual processors (121, 123). An LPAR to which a physical processor is so exclusively dedicated is referred to in this specification as a 'dedicated LPAR'. Physical processors (160, 162, 164, 166, 168) in this example are shared by LPARs (104, 105) through virtual processors (124, 126, 128, 130, 132, 134).

Virtual processors (124, 126, 128, 130, 132, 134) are gathered in a pool (153) of virtual processors available for assignment to LPARs (104, 105). Each virtual processor represents an assignment to an LPAR of a portion of the processing capacity provided by the physical processors (160, 162, 164, 166, 168) supporting the pool (153). The portion of the physical processors supporting the pool that is represented by a virtual processor may be a portion of a physical processor or an entire physical processor. LPARs (104, 105) therefore share physical processors indirectly through pooled virtual processors assigned by a hypervisor (184) to each such LPAR. Such an LPAR, that indirectly shares physical processors through pooled virtual processors, is referred to in this specification as a 'shared processor partition' or a 'shared processor LPAR.'

In the example of FIG. 2, the processing capacity of the seven physical processors (156, 158, 160, 162, 164, 166, 168) is allocated by the hypervisor to the three LPARs (103, 104, 105) as follows:

All of the processing capacity of physical processors (156, 158) is assigned to LPAR (103) through virtual processors (121, 123).

A portion of the processing capacity represented by physical processors (160, 162, 164, 166, 168) equivalent to 2.5 processors is allocated to LPAR (104) through virtual processors (124, 126, 128).

A portion of the processing capacity represented by physical processors (160, 162, 164, 166, 168) equivalent to 2.5 processors is allocated to LPAR (105) through virtual processors (130, 132, 134).

The number, arrangement, and assignments of physical processors, virtual processors, and LPARs in the system of FIG. 2 are for explanation only; they are not a limitation of the present invention. A system for assigning a processor to a logical partition in a computer supporting multiple logical partitions may include any number, arrangement, or assignment of physical processors, virtual processors, and LPARs.

Figure 3:
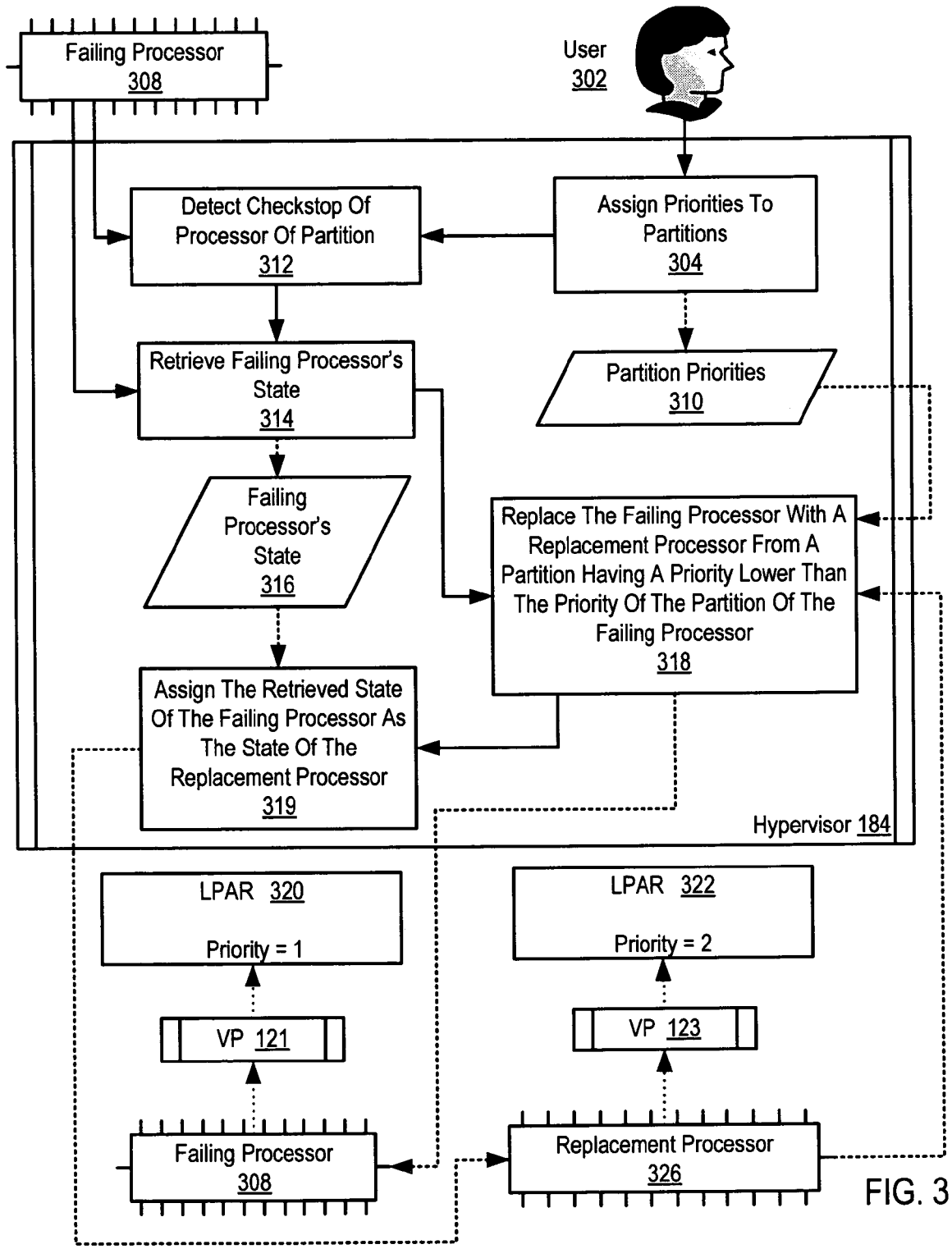
FIG. 3 sets forth a flow chart illustrating an exemplary method for assigning a processor to a logical partition according to embodiments of the present invention.

For further explanation, FIG. 3 sets forth a flow chart illustrating an exemplary method for assigning a processor to a logical partition according to embodiments of the present invention that includes assigning (304) priorities (310) to partitions (320, 322). Assigning priorities to partitions may be carried out by obtaining from a user (302) the priority of partitions and by storing the priorities as assigned by the user (302). Alternatively, assigning priorities to partitions may be carried out by monitoring the loads on the partitions and assigning priorities dependent upon the loads, with the priority increasing with the load. Alternatively, assigning priorities to partitions may be carried out by obtaining priorities from users, by monitoring the loads on partitions, and by assigning the priorities based upon the loads and the input from the users.

The method of FIG. 3 also includes detecting (312) a checkstop of a failing processor (308) of a partition (320). A 'checkstop,' as the term is used in this specification, is an operating error of a processor sufficiently severe, either by itself or in combination with other errors, to warrant replacement of the processor. Physical processors typically signal processor operating errors with vectored hardware interrupts. Detecting a checkstop may be carried out by vectoring interrupts from processor operating errors of physical processors to an interrupt handling routine of a hypervisor. Any error condition or conditions originating from a processor may constitute or cause a checkstop including, for example, memory boundary errors, opcode errors, coprocessor segment errors, memory address errors, arithmetic or floating point errors, memory alignment errors, machine check exceptions, and so on, as will occur to those of skill in the art. Detecting a checkstop may include defining particular errors as individually sufficient to warrant replacement of a processor. Alternatively, detecting a checkstop may include keeping a count of processor operating errors and identifying a checkstop as a count equal to a predefined threshold.

The method of FIG. 3 also includes retrieving (314) the failing processor's state (316). Retrieving (314) the failing processor's state (316) may be carried out by a hypervisor's reading the current values of the registers of the processor directly from the processor and storing the values of the registers of the processor temporarily in random access memory outside the physical processor.

The method of FIG. 3 also includes replacing (318) by a hypervisor (184) the failing processor (308) with a replacement processor (326) from a partition (322) having a priority lower than the priority of the partition (320) of the failing processor. In the example of FIG. 3, processor (308) is a failing processor assigned fully and exclusively to dedicated LPAR (320). LPAR (320) has priority 1, a higher priority than LPAR (322). LPAR (322) is a dedicated LPAR assigned the full capacity of processor (326). In this example, because processor (326) is assigned to an LPAR with the lower priority, processor (326) is identified as the replacement processor. A hypervisor may replace (318) a failing processor (308) with a replacement processor (326) by use of a data structure similar to the one illustrated in Table 1:

TABLE 1

| Record Number | LPAR | VP | PP | Portion |
| --- | --- | --- | --- | --- |
| 1 | 320 | 121 | 308 | 1.0 |
| 2 | 322 | 123 | 326 | 1.0 |

Table 1 has five columns. The 'Record Number' column assigned a reference number to each record in the table, only for convenience of explanation. The values in the 'LPAR' column identify partitions. The values in the 'VP' column identify virtual processors. The values in the 'PP' column identify physical processors. And the values in the 'Portion' column identify the processing capacity, expressed in fractions of a physical processor that is assigned to virtual processors—and indirectly through virtual processors to a partition.

Each record in Table 1 represents a portion of a physical processor assigned to an LPAR through a virtual processor. Record number 1 represents failing processor (308) assigned entirely (Portion=1.0) to LPAR (320) through virtual processor (121). Record number 2 represents replacement processor (326) assigned entirely (Portion=1.0) to LPAR (322) through virtual processor (123).

Hypervisor (184) may replace (318) failing processor (308) with replacement processor (326) by updating the data of Table 1 as shown in Table 2:

TABLE 2

| Record Number | LPAR | VP | PP | Portion |
| --- | --- | --- | --- | --- |
| 1 |  |  | 308 | 0.0 |
| 2 | 320 | 121 | 326 | 1.0 |

Table 2 shows failing processor (308) now not assigned to any LPAR and replacement processor (326) assigned entirely (Portion=1.0) to LPAR (320) through virtual processor (121). The hypervisor's updating of the data values assigning processors to LPARs occurs during interrupt processing, completely transparently with respect to the operations of any operating system or application program. When the hypervisor returns control from its interrupt handing routine, the operating system or application program then continues operations on the replacement processor, completely unaware that the replacement has occurred. In this example, LPAR (322) lost its only assigned processor, replacement processor (326), which was reassigned to LPAR (320) through virtual processor (121). In this example, therefore, LPAR (322) would be terminated.

The method of FIG. 3 also includes assigning (319) the retrieved state (316) of the failing processor (308) as the state of the replacement processor (326). The retrieved state of the failing processor is the values of the registers of the failing processor when the checkstop is detected by the hypervisor. Assigning (319) the retrieved state (316) of the failing processor (308) as the state of the replacement processor (326)

may be carried out by storing the retrieved state (316) in the registers of the replacement processor.

Figure 4:
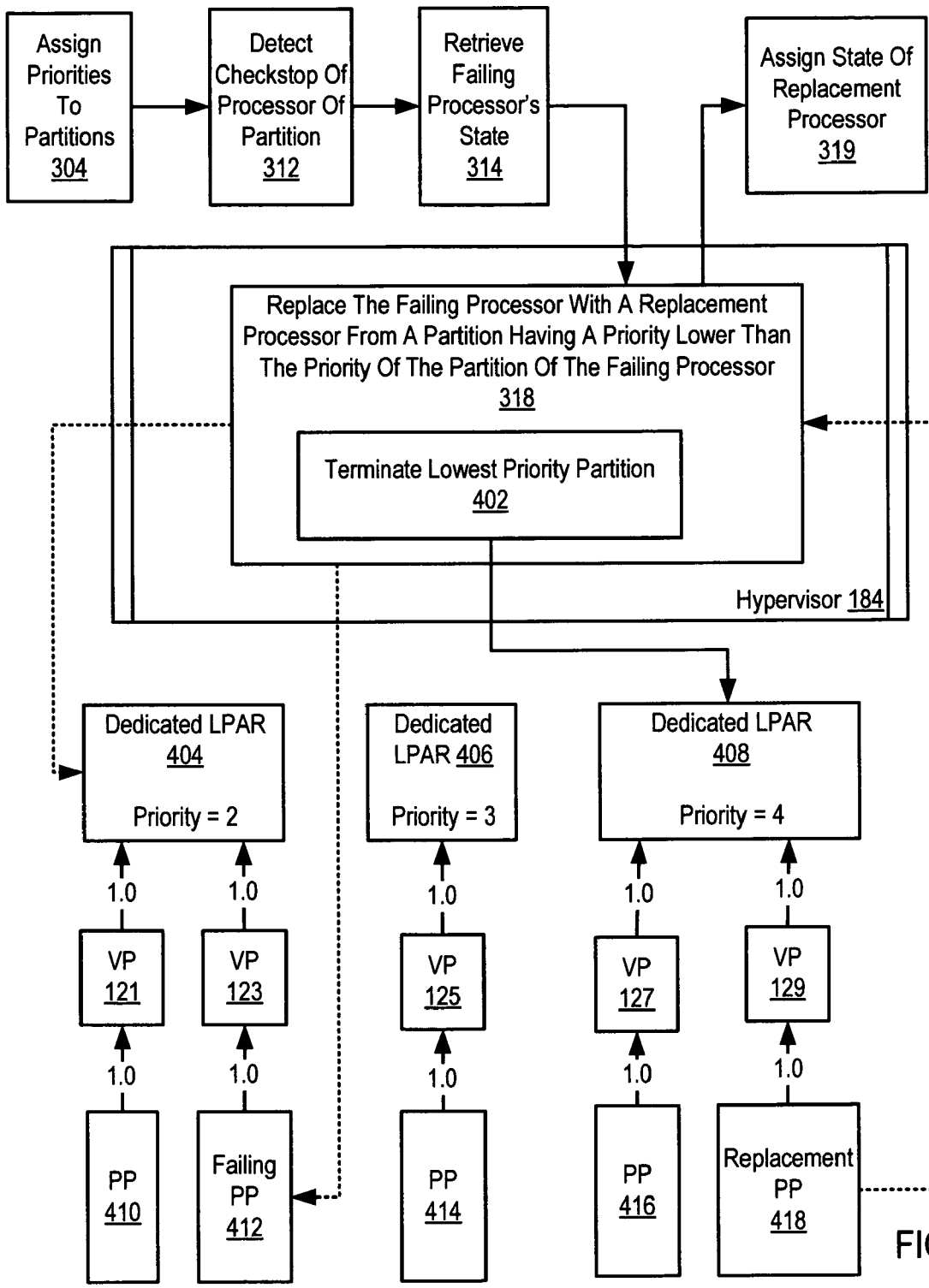
FIG. 4 sets forth a flow chart illustrating a further exemplary method for assigning a processor to a logical partition according to embodiments of the present invention.

For further explanation, FIG. 4 sets forth a flow chart illustrating a further exemplary method for assigning a processor to a logical partition according to embodiments of the present invention. The method of FIG. 4 is similar to the method of FIG. 3 in that the method of FIG. 4 includes assigning (304) priorities to partitions, detecting (312) a checkstop of a failing processor of a partition, retrieving (314) the failing processor's state, and assigning (319) the retrieved state of the failing processor as the state of the replacement processor—all of which operate in a manner similar to the method of FIG. 3 as described above.

The method of FIG. 4 also includes replacing (318) by a hypervisor (184) the failing processor (412) with a replacement processor (419) from a partition (408) having a priority lower than the priority of the partition (404) of the failing processor. In the method of FIG. 4, however, the failing physical processor (412) is assigned to a dedicated partition (404), the lowest priority partition (408) is a dedicated partition, and replacing the failing processor (412) includes terminating (402) the lowest priority partition (408). In the example of FIG. 4, processor (412) is a failing processor assigned fully and exclusively through virtual processor (123) to dedicated LPAR (404). LPAR (408), a dedicated LPAR, has priority 4, a lower priority than LPAR (404) which has priority 2 or LPAR (406) which has priority 3. LPAR (408) is assigned through virtual processor (129) the full capacity of processor (418). In this example, because processor (418) is assigned to an LPAR with the lowest priority, processor (418) is identified as the replacement processor—for replacing the failing processor (412).

In the method of FIG. 4, replacing (318) the failing processor includes terminating (402) the lowest priority partition (408). Terminating (402) the lowest priority partition (408) may be carried out by halting the programs running on the lowest priority partition (408), halting the operating system running on the lowest priority partition (408), and removing LPAR (408) from a table representing the assignment of physical processors to LPARs similar to Tables 1 and 2 discussed above. An updated table representing the assignment of physical processors to LPARs after making these changes is shown as Table 3:

TABLE 3

| Record Number | LPAR | VP | PP | Portion |
|---|---|---|---|---|
| 1 | 404 | 121 | 410 | 1.0 |
| 2 | | | 412 | 0.0 |
| 3 | 404 | 123 | 418 | 1.0 |
| 4 | 406 | 125 | 414 | 1.0 |
| 5 | | | 416 | 0.0 |

Table 3 shows failing processor (412) now not assigned to any LPAR and replacement processor (418) assigned entirely (Portion 1.0) to dedicated LPAR (404) through virtual processor (123). Processor (414) continues to be assigned entirely to LPAR (406) through virtual processor (125). LPAR (408) has been terminated. Processor (416), another processor which had been assigned to the terminated LPAR (408) through virtual processor (127), is now not assigned to any LPAR.

Figure 5:
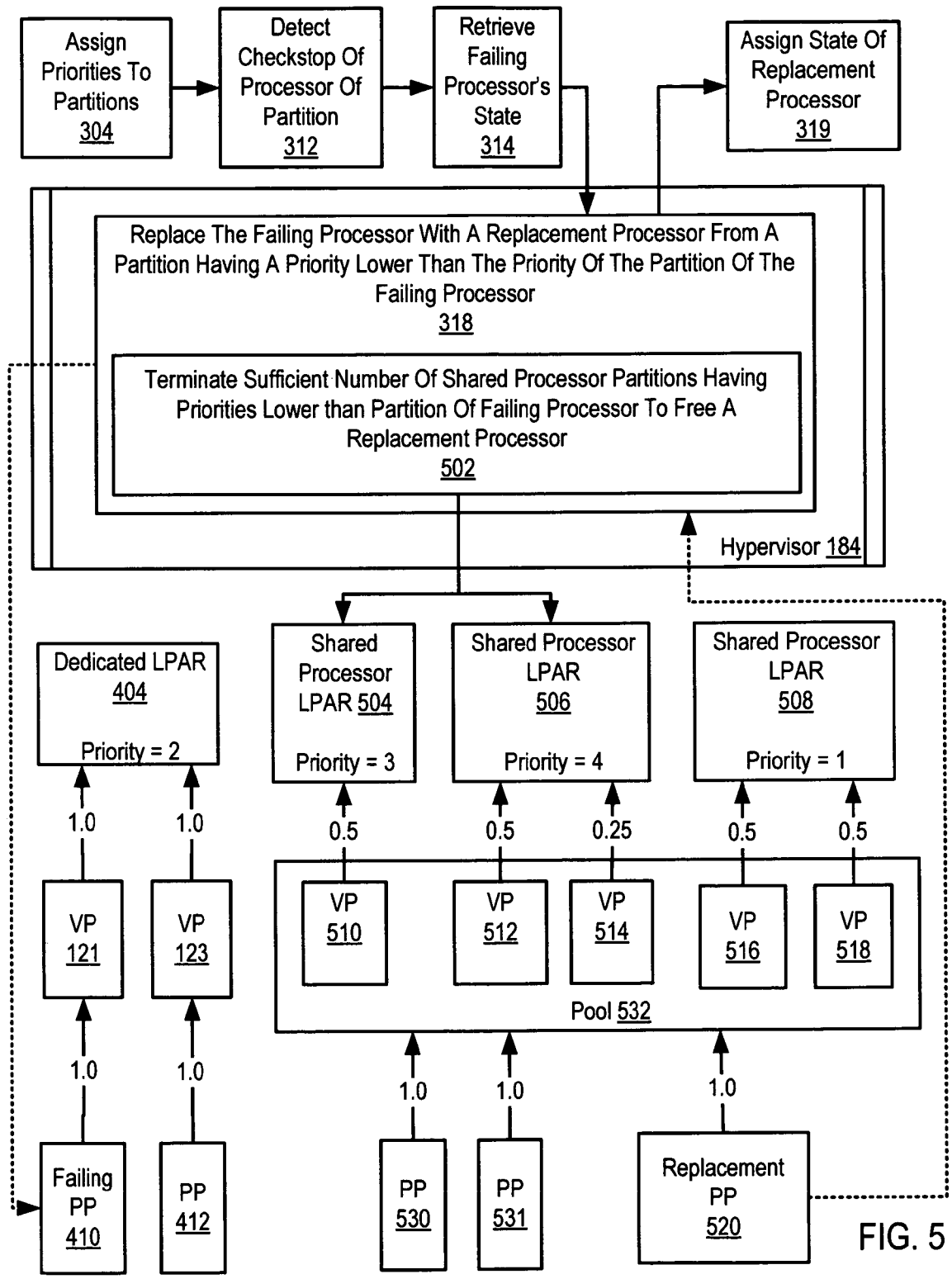
FIG. 5 sets forth a flow chart illustrating a further exemplary method for assigning a processor to a logical partition according to embodiments of the present invention.

For further explanation, FIG. 5 sets forth a flow chart illustrating a further exemplary method for assigning a processor to a logical partition according to embodiments of the present invention. The method of FIG. 5 is similar to the method of FIG. 3 in that the method of FIG. 5 includes assigning (304) priorities to partitions, detecting (312) a checkstop of a failing processor of a partition, retrieving (314) the failing processor's state, and assigning (319) the retrieved state of the failing processor as the state of the replacement processor—all of which operate in a manner similar to the method of FIG. 3 as described above.

The method of FIG. 5 also includes replacing (318) by a hypervisor (184) the failing processor (410) with a replacement processor (520) from a partition (504, 506) having a priority lower than the priority of the partition (404) of the failing processor. In the method of FIG. 5, however, the failing processor (410) is assigned to a dedicated partition (404), partitions having priorities lower than the partition (404) of the failing processor (410) include one or more shared processor partitions (504, 506), and replacing (318) the failing processor (410) includes terminating (502) a sufficient number of the shared processor partitions (504, 506) having priorities lower than the partition (404) of the failing processor (410) to free a replacement processor (520). In the example of FIG. 5, processor (410) is a failing processor assigned fully and exclusively through virtual processor (121) to dedicated LPAR (404). LPARs (504, 506) are shared processor LPARs, indirectly sharing processing capacity from physical processors (530, 531, 520) through pooled virtual processors (510, 512, 514). Through pooled virtual processors (510, 512, 514) LPARs (504, 506) are assigned the processing capacity of 1.25 processors: 0.5 processors through virtual processor (510) to LPAR (504), 0.5 processors through virtual processor (512) to LPAR (506), and 0.25 processors through virtual processor (512) to LPAR (506). Terminating LPARs (504, 506), therefore, terminates a sufficient number of shared processor partitions having priorities lower than the partition (404) of the failing processor (410) to free a processor.

Any of the three processors (530, 531, 520) supporting the pool (532) may be taken as the replacement processor without affecting operation of the remaining shared processor LPAR supported by the pool. The remaining shared processor LPAR (508) is assigned through virtual processor (516, 518) the processing capacity of 1.0 processors, and taking one of the physical processors assigned to the pool to replace a failing processor leaves two physical processors assigned to support a pool that presently needs only one physical processor to satisfy its assignments of processing capacity to virtual processors of the pool.

Terminating a sufficient number of the shared processor partitions (504, 506) having priorities lower than the partition (404) of the failing processor (410) to free a processor (520) may be carried out by halting the programs running on the terminated shared processor partitions (504, 506), halting the operating systems running on the terminated shared processor partitions (504, 506) and removing LPARs (504, 506) from a table representing the assignment of physical processors to LPARs similar to Tables 1 and 2 discussed above. A table representing the assignment of physical processors to LPARs before making these changes is shown as Table 4

TABLE 4

| Record Number | LPAR | VP | PP | Portion |
|---|---|---|---|---|
| 1 | 404 | 121 | 410 | 1.0 |
| 2 | 404 | 123 | 412 | 1.0 |
| 3 | 504 | 510 | 520, 530, 531 | 0.5 |
| 4 | 506 | 512 | 520, 530, 531 | 0.5 |
| 5 | 506 | 514 | 520, 530, 531 | 0.25 |
| 6 | 508 | 516 | 520, 530, 531 | 0.5 |
| 7 | 508 | 518 | 520, 530, 531 | 0.5 |

Table 4 shows processors (410, 412) assigned entirely (Portion=1.0) through virtual processors (121, 123) to dedicated LPAR (404). The shared processor partitions (504, 506, 508) are assigned processing resources through pooled virtual processors (510-518) from the physical processors (520, 530, 531) assigned to the pool. LPAR (504) is assigned the processing capacity of 0.5 physical processors through virtual processor (510). LPAR (506) is assigned the processing capacity of 0.75 physical processors through virtual processors (512, 514). LPAR (508) is assigned the processing capacity of 1.0 physical processors through virtual processors (516, 518).

Table 5 represents the reassignment of physical processors to LPARs after making replacing failing processor (410) with replacement processor (520):

TABLE 5

| Record Number | LPAR | VP | PP | Portion |
|---|---|---|---|---|
| 1 | 404 | 121 | 520 | 1.0 |
| 2 | 404 | 123 | 412 | 0.0 |
| 3 | | | 410 | 0.0 |
| 4 | 508 | 516 | 530, 531 | 0.5 |
| 5 | 508 | 518 | 530, 531 | 0.5 |

Table 5 shows failing processor (410) now not assigned to an LPAR and replacement processor (520) assigned entirely (Portion=1.0) through virtual processor (121) to dedicated LPAR (404). Processor (412) continues to be assigned through virtual processor 123 to LPAR (404). LPARs (504, 506) are terminated; their entries are deleted from the table. LPAR (508) continues to operate as before, with 1.0 physical processors of processing capacity assigned through pooled virtual processors (516, 518).

Figure 6:
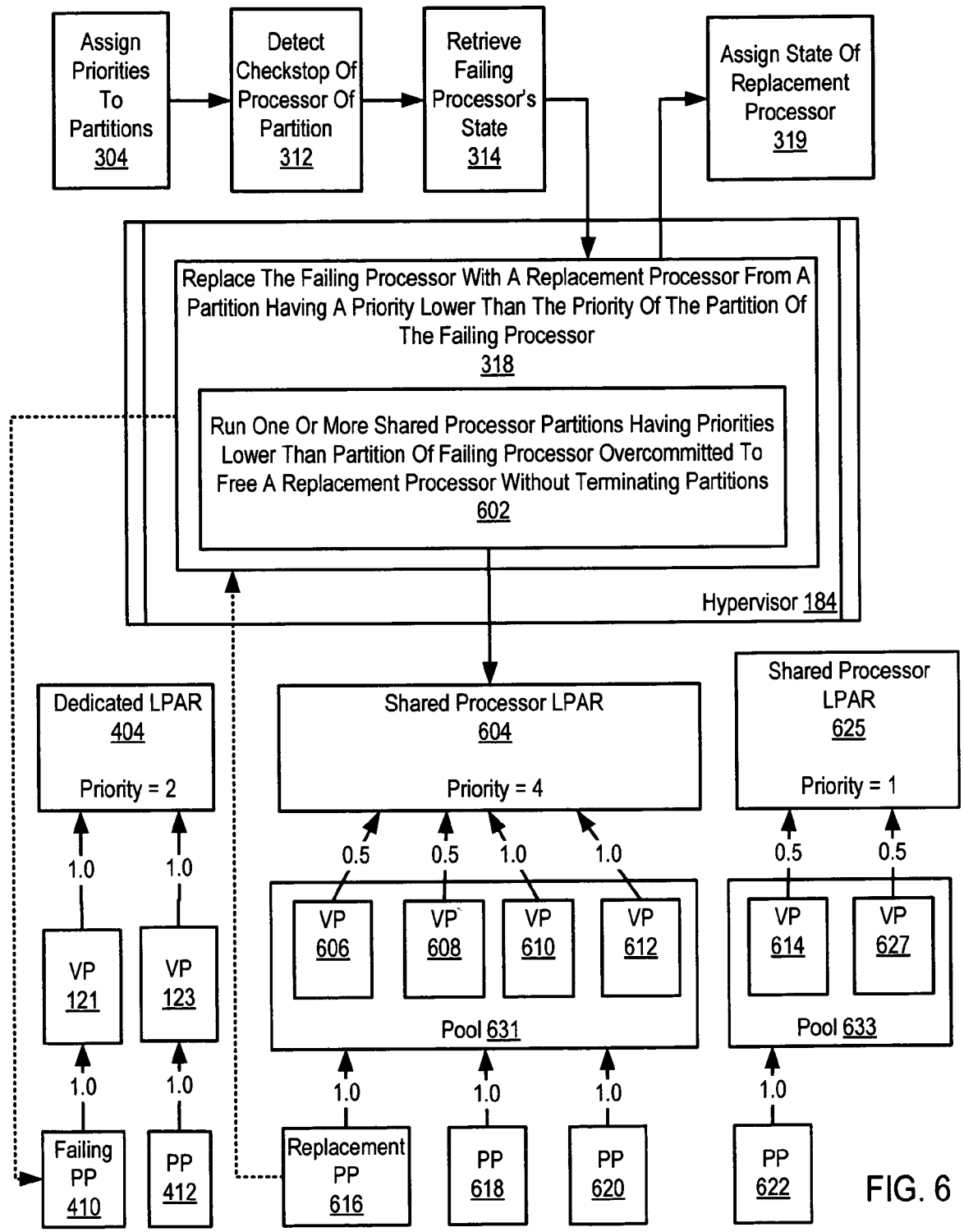
FIG. 6 sets forth a flow chart illustrating a further exemplary method for assigning a processor to a logical partition according to embodiments of the present invention.

For further explanation, FIG. 6 sets forth a flow chart illustrating a further exemplary method for assigning a processor to a logical partition according to embodiments of the present invention. The method of FIG. 6 is similar to the method of FIG. 3 in that the method of FIG. 6 includes assigning (304) priorities to partitions, detecting (312) a checkstop of a failing processor of a partition, retrieving (314) the failing processor's state, and assigning (319) the retrieved state of the failing processor as the state of the replacement processor—all of which operate in a manner similar to the method of FIG. 3 as described above.

The method of FIG. 6 also includes replacing (318) by a hypervisor (184) the failing processor (410) with a replacement processor (616) from a partition (604) having a priority lower than the priority of the partition (404) of the failing processor. In the method of FIG. 6, however, the failing processor (410) is assigned to a dedicated partition (404), partitions having priorities lower than the partition (404) of the failing processor (410) include one or more shared processor partitions (604), and replacing (318) the failing processor (410) includes running (602) one or more of the shared processor partitions (604) having priorities lower than the partition (404) of the failing processor (410) overcommitted to free a replacement processor without terminating partitions. In the example of FIG. 6, processor (410) is a failing processor assigned through virtual processor (121) fully and exclusively to dedicated LPAR (404) which has priority=2.

LPAR (604) is a shared processor LPAR having priority=4, a lower priority than the priority (=2) of the partition (404) of the failing processor (410). LPAR (625) is a shared processor LPAR having priority=1, higher than the priority (=2) of the partition (404) of the failing processor (410). As between LPAR (604) and LPAR (625), therefore, LPAR (604) is chosen to run overcommitted.

LPAR (604) is a shared processor LPAR, indirectly sharing processing capacity from physical processors (616, 618, 620) through pooled virtual processors (606, 608, 610, 612). Through pooled virtual processors (606, 608, 610, 612). LPAR (604) is assigned the processing capacity of 3.0 processors: 0.5 processors through virtual processor (606), 0.5 processors through virtual processor (608), 1.0 processors through virtual processor (610), 1.0 processors through virtual processor (612). Any of the three processors (616, 618, 620) supporting pool (631) may be taken as the replacement processor, leaving LPAR (604) with only two physical processors (618, 620) to support a pool that has committed to its virtual processors (606, 608, 610, 612) the processing capacity of 3.0 physical processors.

In the method of FIG. 6, no partitions are terminated to free a replacement processor. Instead, replacing (318) the failing processor (410) is carried out by running (602) one or more of the shared processor partitions (604) having priorities lower than the partition (404) of the failing processor (410) overcommitted. Replacement processor (616) comes from a set of processors (616, 618, 620) supporting a pool (631) of virtual processors providing processing capacity for shared processor partition (604). Shared processor partition (604) therefore is run overcommitted to free the replacement processor. Running a shared processor partition overcommitted means that the processing capacity represented by virtual processors of the partition is greater than the number of physical processors assigned to provide that capacity. In running a shared processor partition overcommitted, there are more virtual processors assigned to the shared processor partition that there are physical processors to support them.

When a shared processor partition is run overcommitted, during any particular period of data processing, there are fewer times slices on physical processors than there should be into which a hypervisor may dispatch virtual processors of the shared processor partition, and the hypervisor reduces proportionately the number of time in which each virtual processor is dispatched. In the method of FIG. 6, for example, when the physical processors assigned to pool (631) are reduced in number from 3 to 2, a hypervisor may provide to virtual processors (606, 608, 610, 612) respectively the processing capacity of 0.3, 0.3, 0.7, and 0.7 physical processors for a total processing capacity of only 2.0 physical processors, rather than the capacity of 3.0 processors actually assigned to LPAR (604). When running overcommitted, therefore, shared processor partition (604) will not reach the performance indicated by the number of virtual processors assigned to the partition; the shared processor partition will run with degraded performance.

Figure 7:
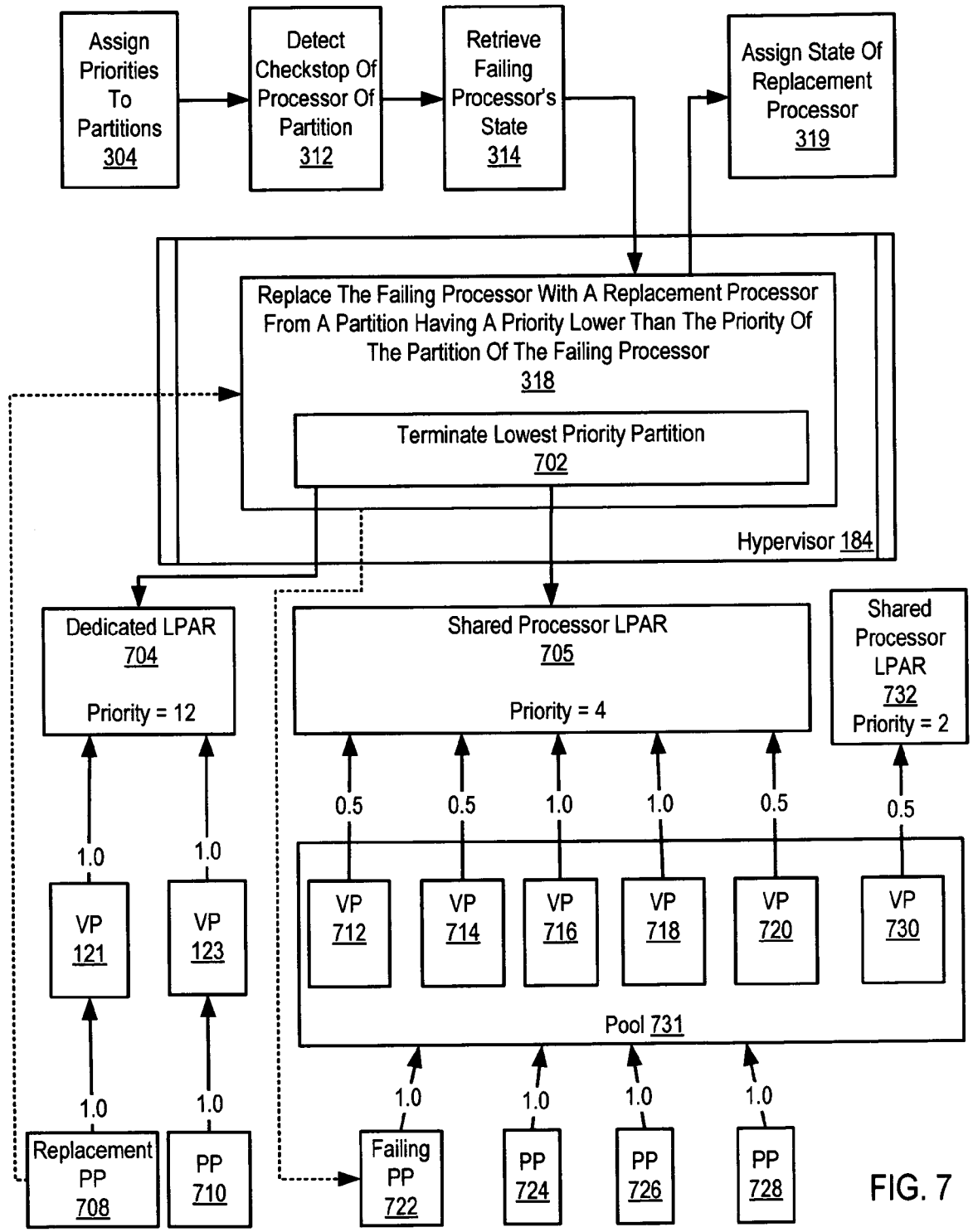
FIG. 7 sets forth a flow chart illustrating a further exemplary method for assigning a processor to a logical partition according to embodiments of the present invention.

For further explanation, FIG. 7 sets forth a flow chart illustrating a further exemplary method for assigning a processor to a logical partition according to embodiments of the present invention. The method of FIG. 7 is similar to the method of FIG. 3 in that the method of FIG. 7 includes assigning (304) priorities to partitions, detecting (312) a checkstop of a failing processor of a partition, retrieving (314) the failing processor's state, and assigning (319) the retrieved state of the failing processor as the state of the a replacement processor—all of which operate in a manner similar to the method of FIG. 3 as described above.

The method of FIG. 7 also includes replacing (318) by a hypervisor (184) the failing processor (722) with a replacement processor (708) from a partition (704) having a priority lower than the priority of the partition (705, 732) of the failing processor. In the method of FIG. 7, however, the failing processor (722) is assigned to a pool (731) of virtual processors (722, 724, 726, 728) where the pool of virtual processors supports one or more shared processor partitions (705, 732), the lowest priority partition (704) is a dedicated partition, and replacing (318) the failing processor (722) includes terminating (702) the lowest priority partition (704). In the example of FIG. 7, processor (722) is a failing processor assigned to a pool (731) of virtual processors (712, 714, 716, 718, 720, 730). LPAR (704), a dedicated LPAR, has lower priority (priority=12) than LPAR (705) (priority=4) and lower priority than LPAR (732) (priority=2). LPAR (704) is assigned the full capacity of processor (708) through virtual processor (121). In this example, because processor (708) is assigned to a dedicated LPAR with the lowest priority, processor (708) is identified as the replacement processor.

As mentioned above, LPAR (704) is the lowest priority partition in the example of FIG. 7. Terminating the lowest priority partition may be carried out in this example therefore by terminating LPAR (704). Terminating (702) LPAR (704) may be carried out by halting any programs running in LPAR (704), halting the operating system running in LPAR (704), and removing LPAR (704) from a table representing the assignment of physical processors to LPARs similar to Tables 1 and 2 discussed above. A table representing the assignment of physical processors to LPARs in the example of FIG. 7 before removing LPAR (704) is shown as Table 6:

TABLE 6

| Record Number | LPAR | VP | PP | Portion |
|---|---|---|---|---|
| 1 | 704 | 121 | 708 | 1.0 |
| 2 | 704 | 123 | 710 | 1.0 |
| 3 | 705 | 712 | 722, 724, 726, 728 | 0.5 |
| 4 | 705 | 714 | 722, 724, 726, 728 | 0.5 |
| 5 | 705 | 716 | 722, 724, 726, 728 | 1.0 |
| 6 | 705 | 718 | 722, 724, 726, 728 | 1.0 |
| 7 | 705 | 720 | 722, 724, 726, 728 | 0.5 |
| 8 | 732 | 730 | 722, 724, 726, 728 | 0.5 |

Table 6 shows processors (708, 710) assigned entirely to dedicated LPAR (704) through virtual processors (121, 123). Processors (722, 724, 726, 728) are assigned to shared processor LPARs (705, 732) through pooled virtual processors (712, 714, 716, 718, 720, 730). Table 7 represents the reassignment of physical processors to LPARs after terminating the lowest priority partition, LPAR (704):

TABLE 7

| Record Number | LPAR | VP | PP | Portion |
|---|---|---|---|---|
| 1 | | | 710 | 0.0 |
| 2 | 705 | 712 | 708, 724, 726, 728 | 0.5 |
| 3 | 705 | 714 | 708, 724, 726, 728 | 0.5 |
| 4 | 705 | 716 | 708, 724, 726, 728 | 1.0 |
| 5 | 705 | 718 | 708, 724, 726, 728 | 1.0 |
| 6 | 705 | 720 | 708, 724, 726, 728 | 0.5 |
| 7 | 732 | 730 | 708, 724, 726, 728 | 0.5 |

Table 7 shows replacement processor (708) assigned along with the other physical processors (724, 726, 728) to shared processor LPARs (705, 732) through pooled virtual processors (712, 714, 716, 718, 720, 730). Failing processor (722) is deleted entirely from Table 7, and processor (710), previously assigned to terminated partition (704) is now shown unassigned.

Figure 8:
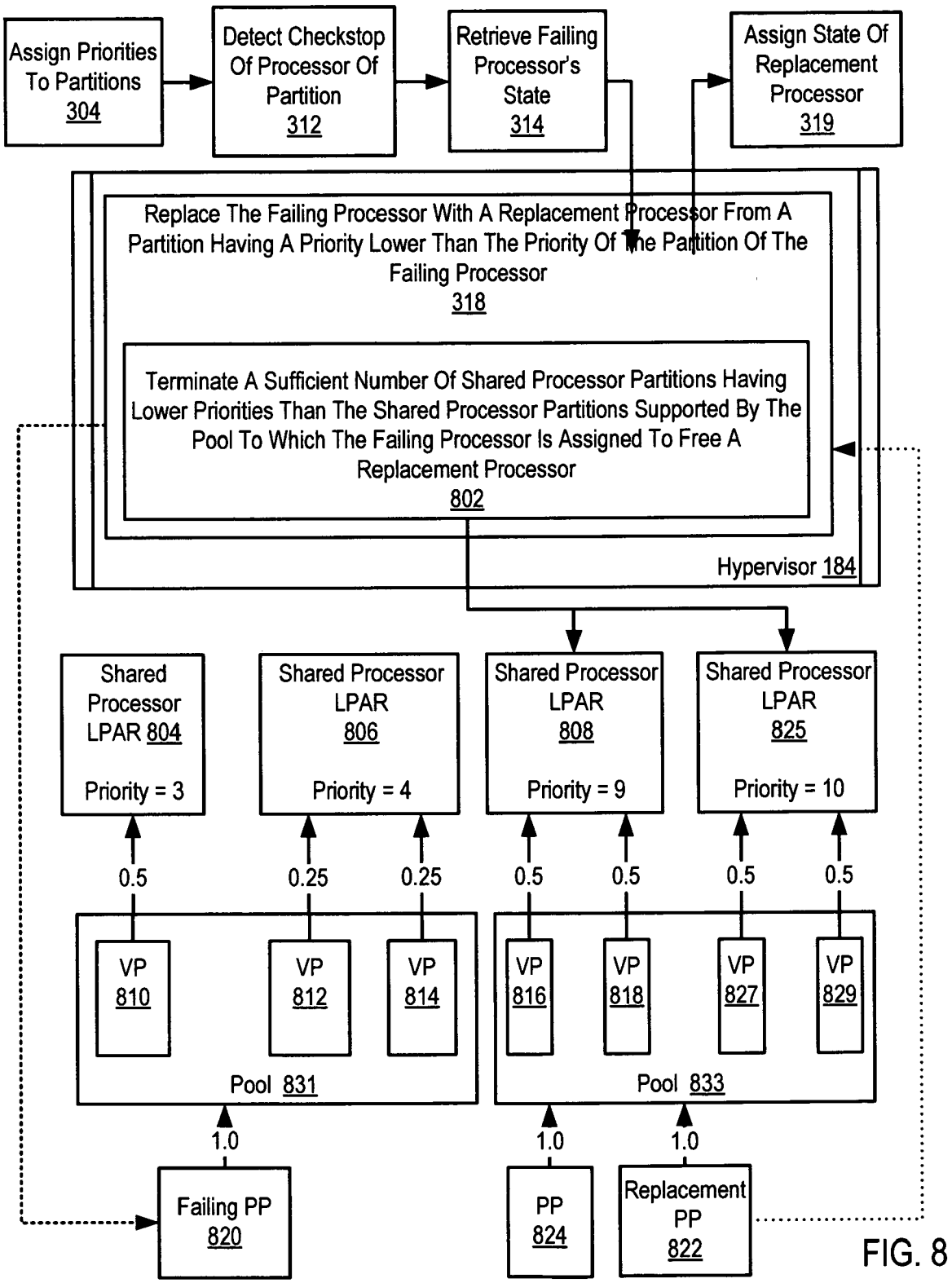
FIG. 8 sets forth a flow chart illustrating a further exemplary method for assigning a processor to a logical partition according to embodiments of the present invention.

For further explanation, FIG. 8 sets forth a flow chart illustrating a further exemplary method for assigning a processor to a logical partition according to embodiments of the present invention. The method of FIG. 8 is similar to the method of FIG. 3 in that the method of FIG. 8 includes assigning (304) priorities to partitions, detecting (312) a checkstop of a failing processor of a partition, retrieving (314) the failing processor's state, and assigning (319) the retrieved state of the failing processor as the state of the a replacement processor—all of which operate in a manner similar to the method of FIG. 3 as described above.

The method of FIG. 8 also includes replacing (318) by a hypervisor (184) the failing processor (820) with a replacement processor (822) from a partition (808, 825) having a priority lower than the priority of the partition (804, 806) of the failing processor. In the method of FIG. 8, however, the failing processor (820) is assigned to a pool (831) of virtual processors (810, 812, 814). The pool of virtual processors supports one or more shared processor partitions (804, 06). In the example of FIG. 8, shared processor partitions (808, 825) having lower priorities (priorities=9, 10) than the shared processor partitions (804, 806) supported by the pool (831) (priorities=3, 4) are available, and replacing (318) the failing processor (820) includes terminating (802) a sufficient number of shared processor partitions (808, 825) having lower priorities than the shared processor partitions (804, 806) supported by the pool (831) to free a replacement processor.

A processor (822) assigned to support a shared processor partition (808, 825) having lower priority than the shared processor partitions to which failing processor (820) is assigned through pool (831) is chosen as a replacement processor. In this example, either of the processors (822, 824) assigned to support the lower priority partitions (808, 825) through pool (833) may be chosen as a replacement processor. In this example, LPARs (808, 825) are LPARs having priorities lower than the one or more shared processor partitions (804, 806) of the failing processor (820), and replacement processor (822) is assigned to LPARs (808, 825). Each of the lower priority partitions (808, 825) is assigned processing capacity from pool (833) of 1.0 processors, and 1.0 processors are needed to replace failing processor (802). Terminating a sufficient number of shared processor partitions having lower priorities than the shared processor partitions supported by pool (831) therefore in this example may be carried out by terminating either of the two lower priority partitions (808, 825). Terminating a shared processor partition may be carried out by halting the programs running on the partition, halting the operating system running on the partition, and removing any entries for the partition from a table representing the assignment of physical processors to pooled virtual processors similar to Tables 1 and 2 discussed above. A table representing the assignment of physical processors to shared processor partitions through pooled virtual processors before removing a shared processor partition is shown as Table 8:

TABLE 8

| Record Number | LPAR | VP | PP | Portion |
|---|---|---|---|---|
| 1 | 804 | 810 | 820 | 0.5 |
| 2 | 806 | 812 | 820 | 0.25 |
| 3 | 806 | 814 | 820 | 0.25 |
| 4 | 808 | 816 | 822, 824 | 0.5 |
| 5 | 808 | 818 | 822, 824 | 0.5 |
| 6 | 825 | 827 | 822, 824 | 0.5 |
| 7 | 825 | 829 | 822, 824 | 0.5 |

Table 8 shows physical processor (820) assigned entirely to shared processor partitions (804, 806) through pooled virtual processors (810, 812, 814). According to Table 8, physical processors (822, 824) are assigned to shared processor partitions (808, 825) through pooled virtual processors (816, 818, 827, 829). Table 9 represents the reassignment of physical processors to shared processor partitions after terminating the lowest priority partition, LPAR (825):

TABLE 9

| Record Number | LPAR | VP | PP | Portion |
|---|---|---|---|---|
| 1 | 804 | 810 | 822 | 0.5 |
| 2 | 806 | 812 | 822 | 0.25 |
| 3 | 806 | 814 | 822 | 0.25 |
| 4 | 808 | 816 | 824 | 0.5 |
| 5 | 808 | 818 | 824 | 0.5 |

Table 9 shows replacement processor (822) assigned to shared processor LPARs (804, 806) through pooled virtual processors (810, 812, 814). Failing processor (820) is deleted entirely from Table 9. Terminated shared processor partition (825) and its supporting virtual processors (827, 829) are deleted entirely from Table 9. All remaining partitions continue to function just as they did before the replacement of the failing processor. Partition (808) is assigned 1.0 processors through pooled virtual processors (816, 818), and 1.0 processors are provided as physical processor (824). Similarly, partitions (804, 806) which together are assigned 1.0 processors through pooled virtual processors (810, 812, 814) continue to have the support of 1.0 physical processors by replacement processor (822). The only effect on system performance of replacing a failing processor according to the method of FIG. 8 is the termination of low priority partition (825).

Figure 9:
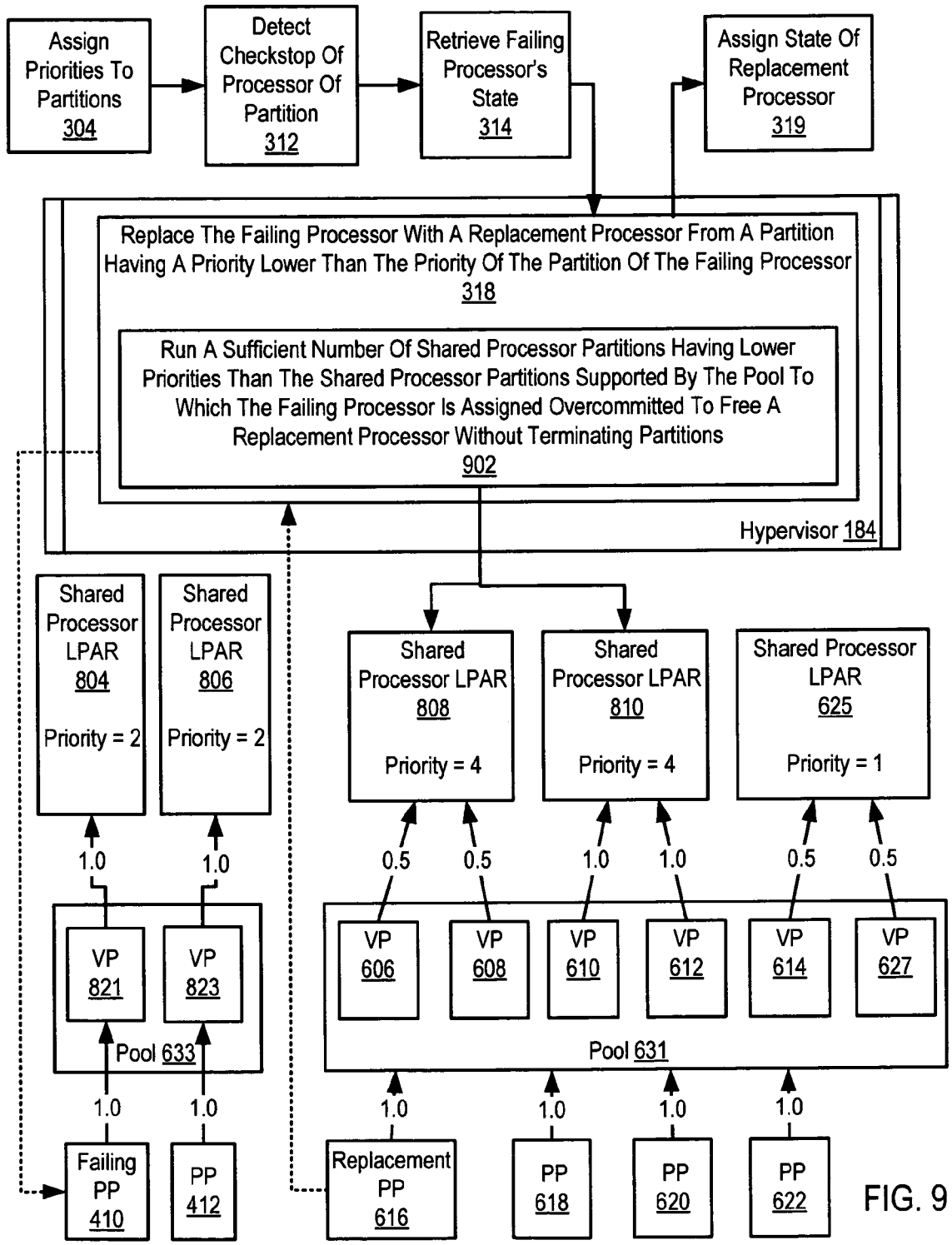
FIG. 9 sets forth a flow chart illustrating a further exemplary method for assigning a processor to a logical partition according to embodiments of the present invention.

For further explanation, FIG. 9 sets forth a flow chart illustrating a further exemplary method for assigning a processor to a logical partition according to embodiments of the present invention. The method of FIG. 9 is similar to the method of FIG. 3 in that the method of FIG. 9 includes assigning (304) priorities to partitions, detecting (312) a checkstop of a failing processor of a partition, retrieving (314) the failing processor's state, and assigning (319) the retrieved state of the failing processor as the state of the replacement processor—all of which operate in a manner similar to the method of FIG. 3 as described above.

The method of FIG. 9 also includes replacing (318) by a hypervisor (184) the failing processor (410) with a replacement processor (616) previously assigned to one or more lower priority partitions (604).

The method of FIG. 9 also includes replacing (318) by a hypervisor (184) the failing processor (410) with a replacement processor (616) from a partition (808, 810) having a priority lower than the priority of the partition (804, 806) of the failing processor. In the method of FIG. 9, however, the failing processor (410) is assigned to a pool (633) of virtual processors (821, 823) that support shared processor partitions (804, 806). Shared processor partitions (808, 810) having lower priority (priority=4) than the shared processor partitions (804, 806) supported by pool (633) (priority=2) are available, and replacing (318) the failing processor (410) includes running (902) a sufficient number of shared processor partitions having lower priorities than shared processor partitions (804, 806) supported by pool (633) overcommitted to free a replacement processor without terminating partitions.

LPARs (808, 810) are a shared processor partitions having priority=4, a lower priority than the priority 2 of the partitions (804, 806) supported by the pool (633) to which the failing processor (410) is assigned. LPAR (625) is a shared processor partition having priority=1, a higher priority than that of the partitions (804, 806) supported by the pool (633) to which the failing processor (410) is assigned. As between LPARs (808, 810) and LPAR (625), therefore, LPARs (808, 810) are chosen to run overcommitted, and the operation of LPAR (625) is left unaffected.

LPARs (808, 810) are shared processor partitions, indirectly sharing processing capacity from physical processors (616, 618, 620, 622) through pooled virtual processors (606, 608, 610, 612). Through pooled virtual processors (606, 608, 610, 612) LPARs (808, 810) are assigned the processing capacity of 3.0 processors: 0.5 processors through virtual processor (606), 0.5 processors through virtual processor (608), 1.0 processors through virtual processor (610), 1.0 processors through virtual processor (612). Any of the four processors (616, 618, 620, 622) supporting pool (631) may be taken as the replacement processor, leaving pool (631) with only three physical processors to support virtual processors (606, 608, 610, 612) to which the processing capacity of 3.0 physical processors are committed.

In the method of FIG. 6, no partitions are terminated to free a replacement processor. Instead, replacing (318) the failing processor (410) is carried out by running overcommitted (902) one or more of the shared processor partitions (808, 810) having priorities lower than the partitions (804, 806) supported by the pool (633) to which the failing processor (410) is assigned. Replacement processor (616) comes from a set of processors (616, 618, 620, 622) supporting a pool (631) of virtual processors providing processing capacity for shared processor partitions (808, 810). Shared processor partitions (909, 810) therefore may be overcommitted to free the replacement processor. Running a shared processor partition overcommitted means that the processing capacity represented by virtual processors of the partition is greater than the number of physical processors assigned to provide that capacity. In running a shared processor partition overcommitted, there are more virtual processors assigned to the shared processor partition that there are physical processors to support them.

When a shared processor partition is run overcommitted, during any particular period of data processing, there are fewer times slices on physical processors than there should be into which a hypervisor may dispatch virtual processors of the shared processor partition, and the hypervisor reduces proportionately the number of time in which each virtual processor is dispatched. When running overcommitted, therefore, a shared processor partition will not reach the performance indicated by the number of virtual processors assigned to the partition; the shared processor partition will run with degraded performance.

In the method of FIG. 6, for example, when the physical processors assigned to pool (631) are reduced in number from four to three, because LPAR (625) is not to be run overcommitted, hypervisor (184) has only the processing capacity of two physical processors to support the operation of LPARs (808, 810). There are a number of ways in which hypervisor (184) may be programmed to run partitions (808, 810) overcommitted:

Hypervisor (194) may run both partitions (808, 810) overcommitted by providing through virtual processors (606, 608, 610, 612) respectively the processing capacity of 0.3, 0.3, 0.7, and 0.7 physical processors for a total processing capacity of only 2.0 physical processors, rather than the capacity of 3.0 processors actually committed to partitions (808, 810) through virtual processors (606, 608, 610, 612).

Hypervisor (194) may run only partition (810) overcommitted, leaving operation of partition (808) unaffected, by providing through virtual processors (610, 612) respectively the processing capacity of 0.5 and 0.5 physical processors for a total processing capacity of only 1.0 physical processors, rather than the capacity of 2.0 processors actually committed to partition (810) through virtual processors (610, 612).

Hypervisor (194) may run only partition (810) overcommitted, leaving operation of partition (808) unaffected, by terminating the operation of virtual processor (610), providing through virtual processor (612) the processing capacity of 1.0 physical processors for a total processing capacity of only 1.0 physical processors, rather than the capacity of 2.0 processors actually committed to partition (810) through virtual processors (610, 612).

Other ways of running such partitions overcommitted may occur to those of skill in the art, and all such ways are well within the scope of the present invention.

Exemplary embodiments of the present invention are described largely in the context of a fully functional computer system for assigning a processor to a logical partition. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for assigning a processor to a logical partition in a computer supporting multiple logical partitions, the method comprising:
    assigning priorities to partitions;
    detecting a checkstop of a failing processor of a partition;
    retrieving the failing processor's state;
    replacing by a hypervisor the failing processor with a replacement processor from a partition having a priority lower than the priority of the partition of the failing processor;
    assigning the retrieved slate of the failing processor as the state of the replacement processor; and
    wherein:
        the failing processor is assigned to a dedicated partition;
        the lowest priority partition is a dedicated partition; and
        replacing the failing processor includes terminating the lowest priority partition.

2. The method of claim 1 wherein:
    the failing processor is assigned to a dedicated partition;
    partitions having priorities lower than the partition of the failing processor include one or more shared processor partitions; and
    replacing the failing processor includes terminating a sufficient number of the shared processor partitions having priorities lower than the partition of the failing processor to free a replacement processor.

3. The method of claim 1 wherein:
    the failing processor is assigned to a dedicated partition;
    partitions having priorities lower than the partition of the failing processor include one or more shared processor partitions; and
    replacing the failing processor includes running one or more of the shared processor partitions having priorities lower than the partition of the failing processor overcommitted to free a replacement processor without terminating partitions.

4. The method of claim 1 wherein:
    the failing processor is assigned to a pool of virtual processors, the pool of virtual processors supporting at least one shared processor partition:
    the lowest priority partition is a dedicated partition; and
    replacing the failing processor includes terminating the lowest priority partition.

5. The method of claim 1 wherein:
    the failing processor is assigned to a pool of virtual processors, the pool of virtual processors supporting one or more shared processor partitions:
    shared processor partitions having lower priorities than the shared processor partitions supported by the pool are available; and
    replacing the failing processor includes terminating a sufficient number of shared processor partitions having lower priorities than the shared processor partitions supported by the pool to free a replacement processor.

6. The method ot claim 1 wherein:
the failing processor is assigned to a pool of virtual processors, the pool of virtual processors supporting one or more shared processor partitions;
shared processor partitions having lower priorities than the shared processor partitions supported by the pool are available; and
replacing the failing processor includes running a sufficient number of shared processor partitions having lower priorities than the shared processor partitions supported by the pool overcommitted to free a replacement processor without terminating partitions.

* * * * *